United States Patent [19]
Hayashi et al.

[11] Patent Number: 5,313,845
[45] Date of Patent: * May 24, 1994

[54] STRAIN DETECTOR

[75] Inventors: Kiyoshi Hayashi; Susumu Ootera; Hirosh Sato; Yoshihiko Utsui, all of Hyogo, Japan

[73] Assignee: Mitsubishi Denki Kabushiki Kaisha, Tokyo, Japan

[*] Notice: The portion of the term of this patent subsequent to Sep. 1, 2009 has been disclaimed.

[21] Appl. No.: 530,695

[22] Filed: May 30, 1990

[30] Foreign Application Priority Data

May 31, 1989 [JP] Japan ................. 1-137937
May 31, 1989 [JP] Japan ................. 1-137938
May 31, 1989 [JP] Japan ................. 1-137939

[51] Int. Cl.⁵ .................................. G01L 3/02
[52] U.S. Cl. ...................... 73/862.334; 73/862.333; 73/862.335; 324/209
[58] Field of Search ........... 73/862.36, 779, 862.69, 73/DIG. 2, 862.333, 862.334, 862.335, 862.336; 324/209, 207.12, 207.15–207.19, 207.22, 207.25, 225, 227; 336/84 R, 84 C, 84 M

[56] References Cited

U.S. PATENT DOCUMENTS

| | | |
|---|---|---|
| 3,861,206 | 1/1975 | Kawafune et al. |
| 4,414,855 | 11/1983 | Iwasaki. |
| 4,765,192 | 9/1988 | Hase et al. ............ 73/862.36 |
| 4,805,466 | 2/1989 | Schiessle et al. ........ 73/862.36 |
| 4,823,620 | 4/1989 | Edo et al. ............ 73/862.36 |
| 5,022,275 | 6/1991 | Satoh et al. ........... 73/862.36 |
| 5,036,713 | 8/1991 | Ikeda et al. ............ 73/779 |

FOREIGN PATENT DOCUMENTS 0079241  5/1985  Japan .................. 73/862.36

OTHER PUBLICATIONS

"Torque Transducers with Stress-Sensitive Amorphous Ribbons of Chevron-Pattern", by I. Sasada et al, IEEE Transaction on Magnetics, vol. Mag.-20, No. 5 Sep. 1984, pp. 951–953.

U.S. appln. Ser. No. 07/285.554 filed Dec. 16, 1988, Art Unit 139.

*Primary Examiner*—Richard E. Chilcot, Jr.
*Assistant Examiner*—Elizabeth L. Dougherty
*Attorney, Agent, or Firm*—Sughrue, Mion, Zinn, Macpeak & Seas

[57] ABSTRACT

A strain detector which is improved in corrosion resistance and moisture resistance and is high in reliability. The strain detector comprises a driven member, a magnetic shielding layer of a non-magnetic or diamagnetic material selectively formed on the driven member, a magnetic layer formed at a portion of the driven member at which the magnetic shielding layer is not formed, and a detecting coil provided corresponding to the magnetic layer. The magnetic layer may be formed in such a manner as to project from the driven member by selectively removing a surface of the driven member. Preferably, a protecting layer is formed on surfaces of the magnetic layer and the magnetic shielding layer. A process of producing such strain detector is also disclosed by which a magnetic shielding layer can be formed only at a required portion of a driven member readily in a short period of time.

7 Claims, 7 Drawing Sheets

STRAIN DETECTOR

BACKGROUND OF THE INVENTION

1. Field of the Invention

This invention relates to a strain detector for detecting a strain of a driven shaft such as, for example, a rotary shaft and also to a process of producing such strain or detector.

2. Description of the Prior Art

Generally, where a driven member to which an external force is applied is made of a magnetic material, a strain is produced in the driven member by the external force, and the magnetic permeability of the driven member varies in response to such strain. Accordingly, a degree of such strain can be detected as a variation in magnetic permeability by flowing magnetic flux through the driven member. Thus, a strain of such a driven shaft made of a soft magnetic material having a high magnetic permeability is conventionally detected in such a manner that a magnetic shielding layer of a non-magnetic material having a high electric conductivity is formed at a portion of a surface of the driven shaft, while and a magnetic layer is formed at the remaining portion of the surface of the driven shaft at which the magnetic shielding layer is not formed. A variation in the magnetic permeability of the magnetic layer is detected to detect such strain.

In the conventional strain detector as described above, since the magnetic layer and the magnetic shielding layer are exposed outside, the change of the strain detector with the passage of time is so great that the sensitivity of the strain detector at an initial stage cannot be maintained long. Consequently, the strain detector is low in reliability.

Figure 13:
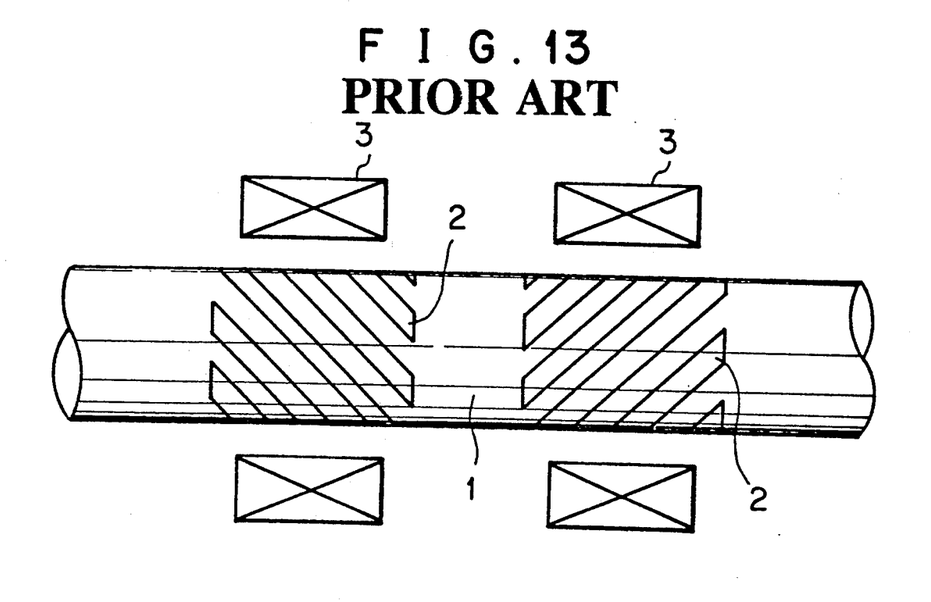
FIG. 13 is a schematic view showing a conventional strain detector.

An exemplary conventional strain detector is disclosed, for example, in Japanese Patent Laid-Open No. 57-211030. Such a strain detector is shown in FIG. 13. Referring to FIG. 13, a driven shaft 1 in the form of a rotary shaft is supported for rotation around a center axis thereof by suitable bearing means not shown. A pair of magnetic layers 2 made of a soft magnetic material having a high permeability and suitable magnetostriction are fixedly mounted on an outer periphery of the driven shaft 1 in a spaced relationship from each other in an axial direction of the driven shaft 1. Each of the magnetic layers 2 is composed of a plurality of parallel layer stripes which extend at angles of +45 degrees and −45 degrees with respect to the center axis. The permeability of each of the magnetic layers 2 thus varies in response to an amount of a strain which is caused by a torque applied to the driven shaft 1. A pair of detecting coils 3 are disposed in a spaced relationship around the magnetic layers 2 on the driven shaft 1 for detecting a variation in magnetic permeability of the magnetic layers 2.

With the strain detector of the construction above construction, if an external torque or force is applied to the driven shaft 1, then a tensile force is produced on either one of the magnetic layers 2 while a compression force is produced on the other magnetic layer 2, thereby causing the magnetic layers 2 to be distorted. The magnetostriction of the magnetic layers 2 allows the orientation of the magnetization within each domain to be altered by such strain, and then the permeability of the magnetic layers 2 is varied. In this instance, the permeability is varied in the opposite direction whether the strain is caused by a tensile force or a compression force, and consequently, the permeabilities of the magnetic layers 2 are varied in opposite directions to each other. The detecting coils 3 detect variations in permeability of the corresponding magnetic layers 2 as variations in magnetic impedance and thus detect an amount of torque applied to the driven shaft 1 and an amount of a strain of the driven shaft 1 produced by such torque.

In the conventional strain detector shown in FIG. 13, however, since the driven shaft 1 and the magnetic layers 2 fixedly applied to the surface of the driven shaft 1 are formed as separate members from each other, a thermal stress is produced in each of the magnetic layers 2 due to a difference in coefficient of thermal expansion between the driven shaft 1 and the magnetic layers 2. Such thermal stress is overlapped with a stress caused by a strain to make an error in measurement of an amount of the strain of the driven shaft 1. Thus, in order to eliminate such error, it has been proposed to form a driven member from a soft magnetic material having a high permeability and selectively form a magnetic shielding layer of a non-magnetic or diamagnetic material having a high electric conductivity at a portion of a surface of the driven member while magnetic layers each composed of a plurality of parallel layer stripes are formed at the other portion of the surface of the driven member at which the magnetic shielding layer is not formed. In this instance, since the driven member and the magnetic layers are formed in an integrated relationship, the problem of a thermal stress described above is eliminated.

With the strain detector described above, however, since the magnetic shielding layer only covers over the surface of the driven member, magnetic fluxes do not readily penetrate into the individual magnetic layer stripes constituting the magnetic layers, and consequently, the magnetic shielding effect of the magnetic shielding layer is low. As a result, the variation in magnetic permeability by a strain of a magnetostrictive layer is small and the output sensitivity of the strain detector is deteriorated.

Further, such conventional strain detector as described above normally adopts vapor deposition, plating, ion plating, or the like as a method of forming a magnetic shielding layer thereof. Any of such methods, however, requires a long period of time to obtain a sufficient film thickness to shield the magnetism and is low in operability. Particularly, conventional electroplating of copper requires about 6 hours to obtain a desired film thickness. Besides, the magnetic shielding layer must necessarily be formed only at a required portion of a driven member, which also deteriorates the operability.

SUMMARY OF THE INVENTION

It is an object of the present invention to provide a strain detector which is improved in corrosion resistance and moisture resistance and is high in reliability.

It is another object of the present invention to provide a process of producing a strain detector by which a magnetic shielding layer can be formed only at a required portion of a driven member readily in a short period of time.

It is a further object of the present invention to provide a strain detector which is high in sensitivity and to provide a process of producing such strain detector.

In order to attain the objects, according to an aspect of the present invention, there is provided a strain detector which comprises a driven member made of a soft magnetic material having a high permeability and adapted to receive an external force, a magnetic shielding layer made of a non-magnetic or diamagnetic material having a high electric conductivity and selectively formed on a surface of the driven member, a magnetic layer formed at a portion of the surface of the driven member at which the magnetic shielding layer is not formed, a protecting layer formed on surfaces of the magnetic layer and the magnetic shielding layer, and a detecting coil provided corresponding to the magnetic layer for detecting a variation in permeability of the magnetic layer corresponding to a strain of the magnetic layer by an external force applied to the driven member.

With the strain detector, the protecting layer is formed on the surfaces of the magnetic layer and the magnetic shielding layer. Consequently, the corrosion resistance and the moisture resistance of the magnetic layer and the magnetic shielding layer are improved. Consequently, the change of them with the passage of time is decreased, and a sensitivity of the strain detector at an initial stage can be maintained long. Accordingly, the reliability of the strain detector is improved.

According to another aspect of the present invention, there is provided a strain detector which comprises a driven member made of a soft magnetic material having a high permeability and adapted to receive an external force, a magnetic layer formed in such a manner as to project from the driven member by selectively removing a surface of the driven member, a magnetic shielding layer made of a non-magnetic or diamagnetic material having a high electric conductivity and filled in the portion of the driven member from which the driven member is removed, and a detecting coil provided corresponding to the magnetic layer for detecting a variation in permeability of the magnetic layer corresponding to a strain of the magnetic layer by an external force applied to the driven member. The strain detector may further comprise a protecting layer formed on surfaces of the magnetic layer and the magnetic shielding layer.

With the strain detector, since the magnetic layer is formed in such a manner as to project from the driven member by selectively removing the surface of the driven member and the magnetic shielding layer is formed at the portion of the driven member from which the driven member is removed, the magnetic shielding effect of the magnetic shielding layer reaches a deeper portion of the driven member and accordingly is improved. Consequently, the variation in permeability by a strain of the magnetic layer is increased and the detecting sensitivity of the strain detector is improved.

According to a further aspect of the present invention, there is provided a process of producing a strain detector, which comprises the steps of forming a driven member from a soft magnetic material having a high permeability, forming a magnetic shielding layer of a non-magnetic or diamagnetic metal having a high electric conductivity on an entire face of a predetermined portion of the driven member by high speed plating, removing part of the magnetic shielding layer to expose the driven member to form a magnetic layer, and disposing around the magnetic layer a detecting coil for detecting a variation in permeability of the magnetic layer corresponding to a strain of the driven member produced by an external force applied to the driven member. A protecting layer may be formed, after part of the magnetic shielding layer has been removed, on a surface of the magnetic layer and a surface of the magnetic shielding layer remaining on the driven member.

With the producing process, since a magnetic shielding layer is formed by high speed plating, it can be formed in a short period of time and thickness control of the same can be performed readily. Further, since such magnetic shielding layer is formed once on an entire face of a predetermined portion of a driven member and then an unnecessary portion thereof is removed, it can be formed readily even if it has a complicated configuration. Accordingly, the magnetic shielding layer can be produced with a high degree of accuracy at a low cost. Further, the magnetic shielding layer is superior in fixing strength to the driven member and accordingly is high in reliability.

According to a still further aspect of the present invention, there is provided a process of producing a strain detector, which comprises the steps of forming a driven member from a soft magnetic material having a high permeability, selectively forming plating resist on a surface of the driven member, forming a magnetic shielding layer of a non-magnetic or diamagnetic metal having a high electric conductivity by high speed plating on a portion of the driven member other than the portion on which the plating resist is formed, removing the plating resist to expose part of the driven member to form a magnetic layer, and disposing around the magnetic layer a detecting coil for detecting a variation in permeability of the magnetic layer corresponding to a strain of the driven member produced by the external force applied to the driven member. A protecting layer may be formed, after the plating resist has been removed, on a surface of the magnetic layer and a surface of the magnetic shielding layer on the driven member.

With the producing process, since a magnetic shielding layer is formed by high speed plating, it can be formed in a short period of time and thickness control of the same can be performed readily. Further, since such magnetic shielding layer is formed using plating resist, it can be formed readily even if it has a complicated configuration. Accordingly, the magnetic shielding layer can be produced with a high degree of accuracy at a low cost. Further, the magnetic shielding layer is superior in fixing strength to the driven member and accordingly is high in reliability.

According to a yet further aspect of the present invention, there is provided a process of producing a strain detector, which comprises the steps of forming a driven member from a soft magnetic material having a high permeability, selectively removing a surface of the driven member to form a magnetic layer in such a manner as to project from the driven member, forming a magnetic shielding layer of a non-magnetic or diamagnetic material having a high electric conductivity by plating at the portion of the driven member from which the driven member has been selectively removed, and disposing around the magnetic layer a detecting coil for detecting a variation in permeability of the magnetic layer corresponding to a strain of the magnetic layer by the external force applied to the driven member.

Etching resist may be selectively formed on a surface of the driven member. In this instance, a surface of a portion of the driven member on which the etching resist is not formed is selectively removed to form a magnetic layer, and the etching resist is removed after a magnetic shielding layer is formed. Or alternatively, plating resist may be formed on the magnetic layer after the magnetic layer has been formed on the driven member. In this instance, the plating resist is removed after a magnetic shielding layer is formed.

With the producing process, since a magnetic shielding layer is formed by plating, it can be formed readily at a low cost. Further, since a magnetic layer of a strain detector produced by the process of the present invention is formed in such a manner as to project from a driven member by selectively removing a surface of the driven member and the magnetic shielding layer is formed at a portion of the driven member from which the driven member is removed, the magnetic shielding effect of the magnetic shielding layer reaches a deeper portion of the driven member and accordingly is improved. Consequently, the variation in permeability by a strain of the magnetic layer is increased and the detecting sensitivity of the strain detector is improved. Accordingly, the strain detector is high in accuracy and reliability.

The above and other objects, features and advantages of the present invention will become apparent from the following description and the appended claims, taken in conjunction with the accompanying drawings in which like parts are denoted by like reference characters all through the drawings.

DESCRIPTION OF THE PREFERRED EMBODIMENTS

Figure 1:
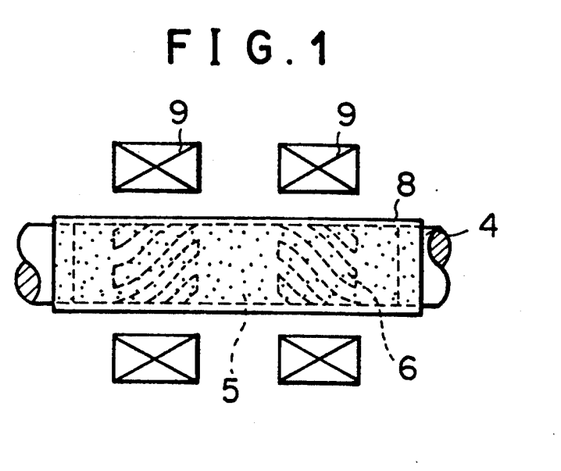
FIG. 1 is a schematic side elevational view of a strain detector to which the present invention is applied.
Figure 2A:
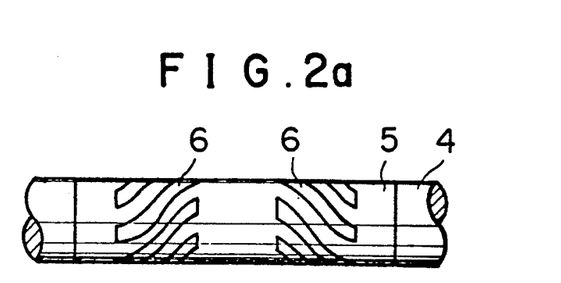
FIGS. 2a to 2c are illustrated different steps of a process of producing the strain detector of FIG. 1.
Figure 2B:
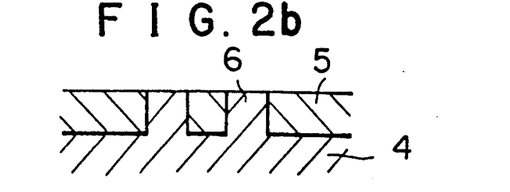
Figure 2C:
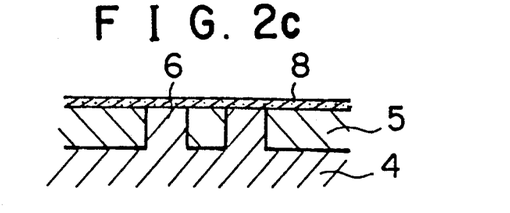

Referring first to FIGS. 2a to 2c, there is shown a process of producing a strain detector shown in FIG. 1 to which the present invention is applied. A driven member 4 in the form of a shaft is first formed from a soft magnetic material having a high permeability such as permalloy. Then, etching resist is selectively printed on a surface of the driven member 4 by a screen printing method, and then, chemical etching is conducted using etching liquid such as solution of cupric chloride to selectively remove any portion of a surface of the driven member 4 other than the portion at which the etching resist is formed to a predetermined depth thereby to leave a pair of magnetic layers 6 corresponding to the etching resist on the driven member 4. Here, each of the magnetic layers 6 projects from the portion of the driven member 4 corresponding to the etching resist as seen in FIG. 2b and is composed of a plurality of magnetic layer stripes which are individually inclined by ±45 degrees with respect to a center axis of the driven member 4. Subsequently, using the etching resist as plating resist, a magnetic shielding layer 5 of a non-magnetic or diamagnetic material having a high electric conductivity such as, for example, copper is formed by high speed plating on any portion of the surface of the driven member 4 from which material of the driven member 4 has been removed by chemical etching. When high speed plating is to be performed, it is necessary to assure a high metal ion concentration of the plating liquid, to keep the plating liquid at a high temperature and to agitate the plating liquid hard. The plating conditions are, for example, such that the driven member 4 is dipped in plating liquid containing 1.5 mol/l of copper sulfate and 0.6 mol/l of sulfuric acid and high speed electroplating is performed at a temperature of 60 degrees with a current density of 50 A/dm$^2$ for 23 minutes while agitating the plating liquid with a blade which is rotated at a high speed. Subsequently, the etching resist as plating resist is removed to expose the magnetic layers 6. The driven member 4 at the stage is shown in FIGS. 2a and 2b. Then, an organic material such as a plastic material, for example, ink of an epoxy resin, is printed by a screen printing method on surfaces of the magnetic layers 6 and the magnetic shielding layer 5 and is then caused to cure to form a protecting layer 8 as seen in FIGS. 2c and 1. Finally, a pair of detecting coils 9 are assembled in an opposing relationship to outer peripheries of the magnetic layers 6 as seen in FIG. 1.

Figure 3:
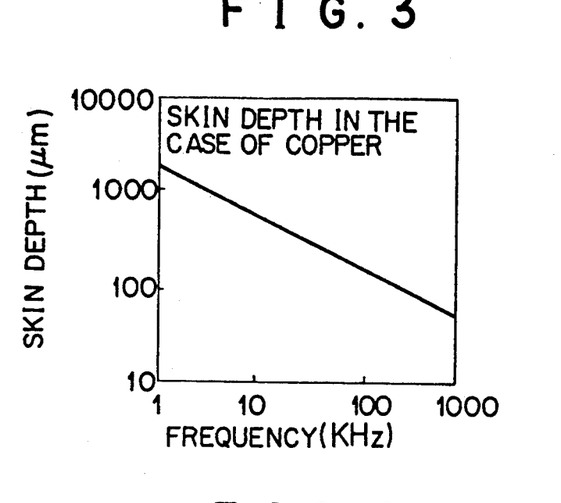
FIG. 3 is a graph illustrating a skin depth characteristic of copper.

In the strain detector of the construction described above, the magnetic shielding layer 5 is provided to prevent magnetic fluxes produced from the detecting coils 9 from penetrating into the driven member 4 due to a magnetic skin effect. Where an electric conductivity of the magnetic shielding layer 5 is represented by $\sigma$, a permeability by $\mu$, and a circular frequency of magnetic fluxes by $\omega$, a skin depth $\delta$ of magnetic fluxes is represented by $\delta = \sqrt{2/\omega\sigma\mu}$, and since the magnetic shielding layer 5 is high in electric conductivity $\sigma$ and also in circular frequency $\omega$, the skin depth $\delta$ is small. In the case of copper, the skin depth $\delta$ is $\delta = 250$ μm or so at 50 kHz as seen from FIG. 3, and accordingly, where the magnetic shielding layer 5 has a film thickness greater than 250 μm, it can prevent penetration of magnetic fluxes.

If an external force is applied to the driven member 4, a strain is produced in each of the magnetic layers 6 by way of the driven member 4 to vary the permeabilities of the magnetic layers 6. The detecting coils 9 detect such variations in permeability of the magnetic layers 6 as variations in magnetic impedance and develop corresponding outputs from which an amount of such strain can be detected. In this instance, the output of one of the detecting coils 9 which corresponds to one of the magnetic layers 6 which is formed in an inclined relationship by +45 degrees with respect to the center axis of the driven member 4 is opposite in polarity to the output of the other detecting coil 9 which corresponds to the other magnetic layer 6 which is formed in an inclined relationship by −45 degrees with respect to the center axis of the driven member 4, and accordingly, a high output can be obtained by taking a difference between the two outputs. Meanwhile, the protecting layer 8 increases the corrosion resistance and the moisture resistance of the magnetic layers 6 and the magnetic shielding layer 5 to reduce changes of them with the passage of time. Consequently, a high reliability of the strain detector can be assured.

It is to be noted that, while the protecting layer 5 is formed by printing of an organic material in the producing process described above, it may otherwise be formed by plasma flame coating of an organic material. Plasma flame coating proceeds such that powder of flame coating material is heated and accelerated by plasma jetting such that it collides with a surface of a raw material to form a film of the flame coating material on the surface of the raw material. By such plasma flame coating, a film can be formed at a speed of 100 μm or so for one minute, and the film forming speed is high.

Figure 4A:
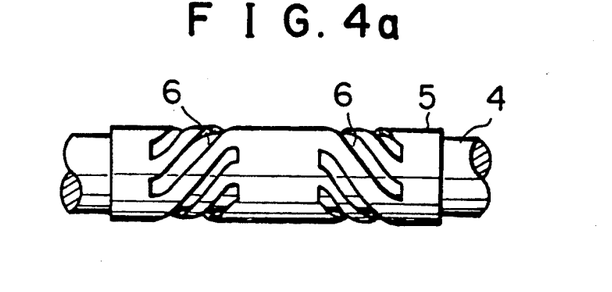
FIGS. 4a to 4c illustrate different steps of a process of producing a modified strain detector.
Figure 4B:
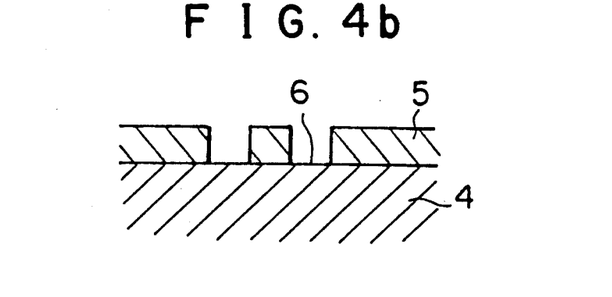
Figure 4C:
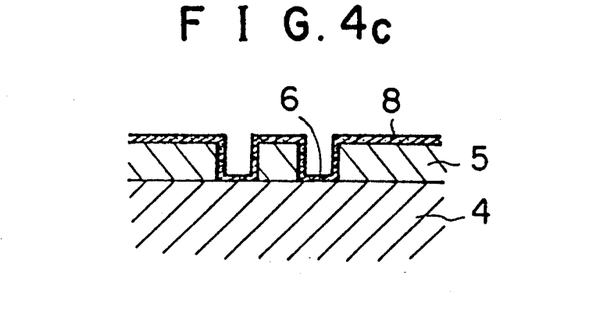

Referring now to FIGS. 4a to 4c, there are shown different steps of a process of producing a strain detector of a modified construction. A driven member 4 in the form of a shaft is first formed from a soft magnetic material having a high permeability, and then, a magnetic shielding layer 5 of a non-magnetic or diamagnetic metal having a high electric conductivity such as, for example, copper is formed by high speed plating on an entire surface of a predetermined portion of the driven member 4. Then, chemical etching is performed using etching liquid such as solution of cupric chloride to remove part of the magnetic shielding layer 5 to expose the surface of the driven member 4 to form a pair of magnetic layers 6 each composed of a plurality of magnetic layer stripes. The driven member 4 in the condition is shown in FIGS. 4a and 4b. Then, plasma flame coating is performed to form a protecting layer 8 of an alumina ceramics material with a thickness of 100 μm on surfaces of the magnetic layers 6 and the magnetic shielding layer 5 as seen in FIG. 4c. Finally, a pair of detecting coils not shown are assembled in an opposing relationship to outer peripheries of the magnetic layers 6 similarly as in the strain detector shown in FIG. 1.

The strain detector produced in this manner operates in a similar manner as in the case of the preceding strain detector shown in FIG. 1 and also presents similar effects to those of the preceding strain detector. It is to be noted that, while the protecting layer 8 of a ceramics material is formed by plasma flame coating, it may otherwise be formed by electrodeposition. In this instance, such ceramics material is deposited on the surfaces of the magnetic layers 6 and the magnetic shielding layer 5 at an ordinary temperature by electrodeposition similarly as by plating, and the protecting layer 8 thus produced exhibits a high corrosion resistance.

Referring again to FIGS. 4a to 4c, such a strain detector as described above may be produced in a different process. In particular, plating resist is formed in a pair of stripe patterns each composed of a plurality of stripes on a surface of a driven member 4 in the form of a shaft, and a magnetic shielding layer 5 is formed on any portion of the surface of the driven member 4 other than the portion corresponding to the plating resist by high speed plating. Subsequently, the plating resist is removed to expose the driven member 4 to form magnetic layers 6. The driven member 4 in such condition can be seen in FIGS. 4a and 4b. Then, a non-magnetic metal material is applied to surfaces of the magnetic layers 6 and the magnetic shielding layer 5 by electroplating to form a protecting layer 8 as seen in FIG. 4c. The protecting layer 8 may be formed, for example, with a thickness of 2 μm or so in the case of nickel but with a thickness of 1 μm or so in the case of gold. Also the strain detector produced in this manner operates in a similar manner as in the case of the preceding strain detector shown in FIG. 1 and also presents similar effects to those of the preceding strain detector. It is to be noted that the protecting layer 8 may be formed not by electroplating but by electrodeposition, plasma flame coating or printing.

Figure 5A:
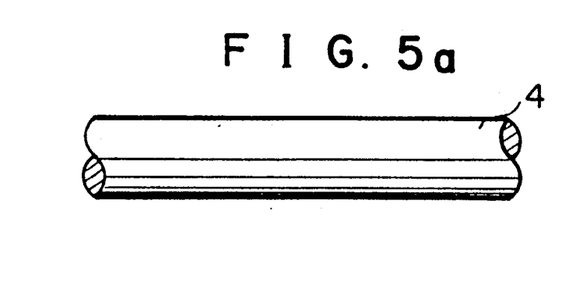
FIGS. 5a to 5c illustrate different steps of a process of producing a strain detector to which the present invention is applied.
Figure 5B:
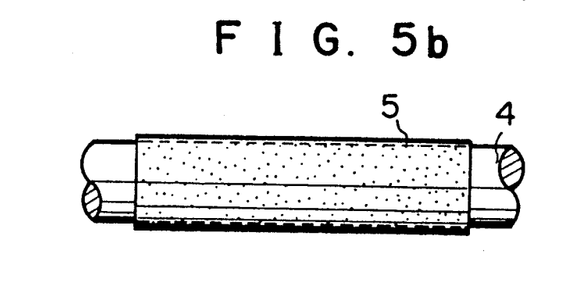
Figure 5C:
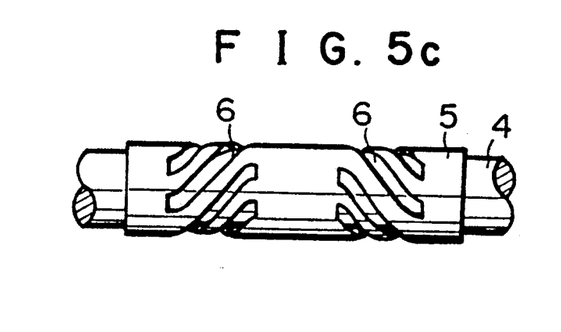
Figure 6A:
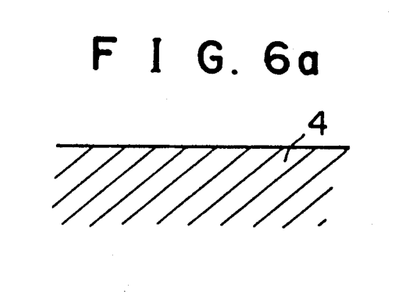
FIGS. 6a to 6c illustrate different steps of another process of producing a strain detector to which the present invention is applied.
Figure 6B:
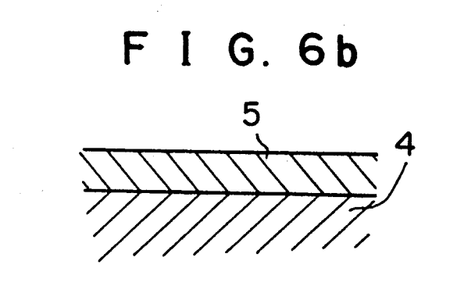
Figure 6C:
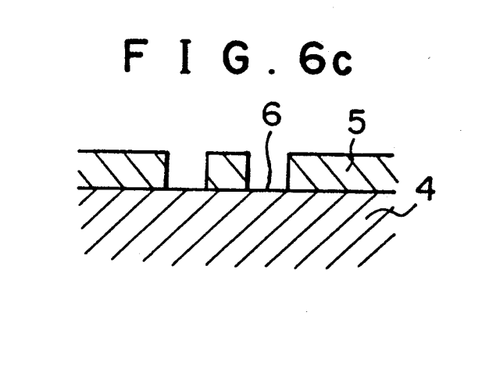

Referring now to FIGS. 5a to 5c and 6a to 6c, there is shown a further process of producing a strain detector according to the present invention. A driven member 4 in the form of a shaft is first formed such as permalloy as shown in FIGS. 5a and 6a from a soft magnetic material having a high permeability. Subsequently, a magnetic shielding layer 5 of a non-magnetic or diamagnetic metal having a high electric conductivity such as, for example, copper is formed on an entire face of a predetermined portion of the driven member 4 as shown in FIGS. 5b and 6b by high speed plating. High speed plating has a plating speed higher by several to several tens times an ordinary speed of electroplating and requires a high limiting current density. The plating conditions may be similar to those described hereinabove in connection with the producing process illustrated in FIGS. 2a to 2c. Also here, if the magnetic shielding layer 5 has a film thickness greater than 250 μm, it can prevent penetration of magnetic fluxes as described hereinabove. Subsequently, chemical etching is performed using etching liquid such as, for example, of solution of cupric chloride to remove part of the magnetic shielding layer 5 to expose the driven member 4 to form a pair of magnetic layers 6 each composed of a plurality of magnetic layer stripes as seen in FIGS. 5c and 6c. Finally, a pair of detecting coils not shown are assembled in an opposing relationship to outer peripheries of the magnetic layers 6 similarly as in the strain detector shown in FIG. 1.

In the producing process described above, since the magnetic shielding layer 5 is formed by high speed plating, it can be formed in a short period of time, and besides since film thickness control can be conducted readily, the magnetic shielding layer 5 can be formed with a high degree of accuracy. Meanwhile, since the magnetic shielding layer 5 is formed on the entire surface of the required portion of the driven member 4 once and unnecessary portions of the magnetic shielding layer 5 are removed by chemical etching after then, the magnetic shielding layer 5 can be formed readily even if it has a complicated configuration. Besides, the magnetic shielding layer 5 is high in adhering strength to the driven member 4 and can be produced with a high degree of accuracy but at a reduced cost while having a high reliability.

It is to be noted that, while unnecessary portions of the magnetic shielding layer 5 are removed by chemical etching in the producing process described above, similar effects can be attained even if they are otherwise removed by mechanical machining or by thermal working using an energy beam.

Figure 7A:
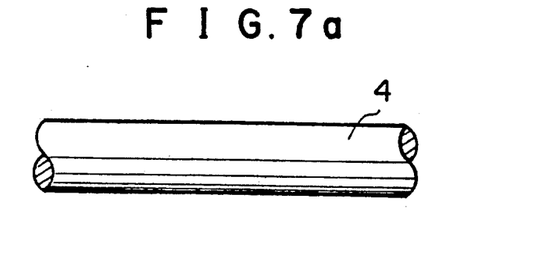
FIGS. 7a to 7d illustrate different steps of a further process of producing a strain detector to which the present invention is applied.
Figure 7B:
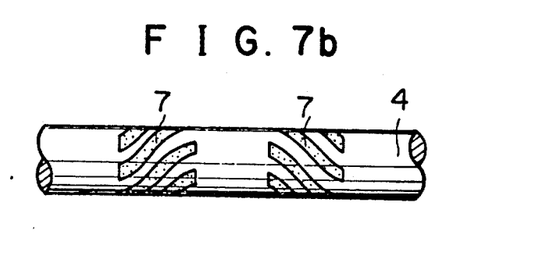
Figure 7C:
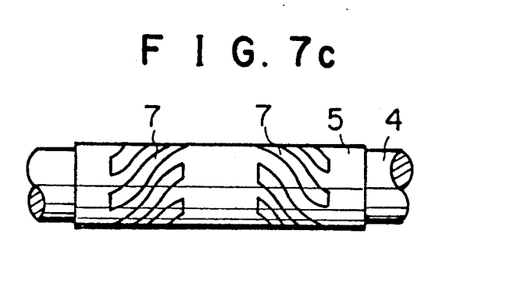
Figure 7D:
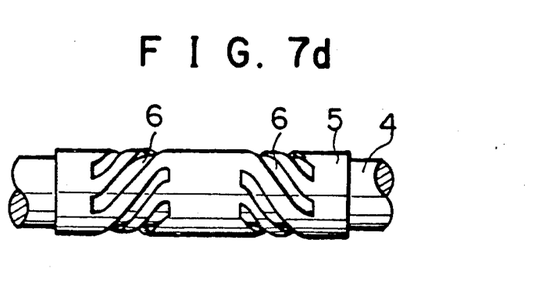
Figure 8A:
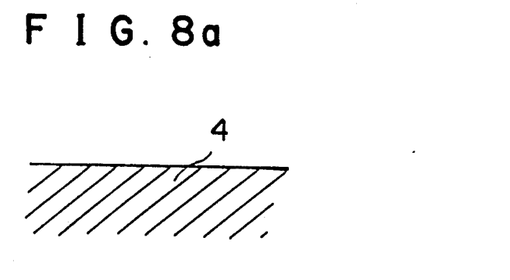
FIGS. 8a to 8d are enlarged sectional views corresponding FIGS. 7a to 7d, respectively.
Figure 8B:
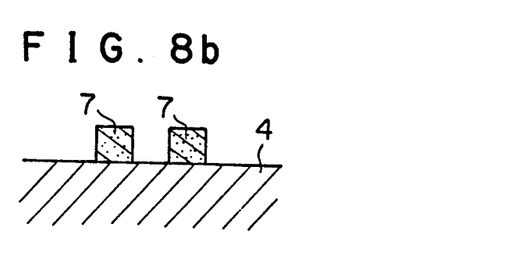
Figure 8C:
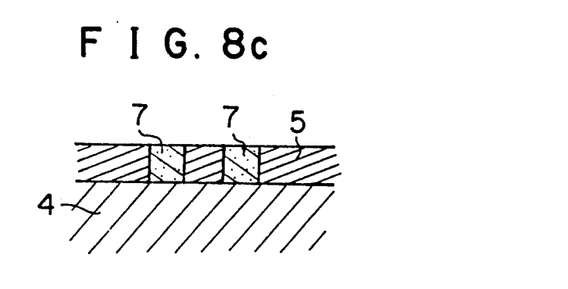
Figure 8D:
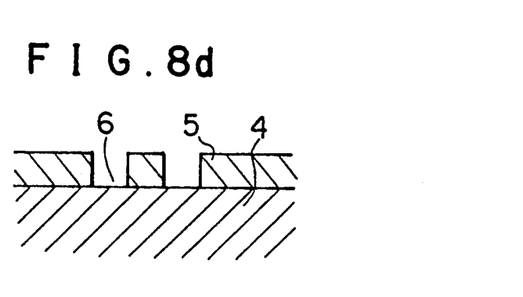

Referring now to FIGS. 7a to 7d and 8a to 8d, there is shown a yet further process of producing a strain detector. A driven member 4 is first formed from a soft magnetic material having a high permeability as shown in FIGS. 7a and 8a, and then, acid resisting resist ink is printed as shown in FIGS. 7b and 8b by screen printing at those portions of the driven member 4 which will thereafter make magnetic layers 6 to form a pair of stripe patterns of plating resist 7 each consisting of a plurality of stripes. Then, a magnetic shielding layer 5 of, for example, copper is formed by high speed plating at any portion of the surface of the driven member 4 other than the portion corresponding to the plating resist 7. The plating conditions may be similar to those described hereinabove. Subsequently, the plating resist 7 is removed to expose the corresponding portions of the driven member 4 to thus form magnetic layers 6.

Also with the producing process, since the plating resist 7 is used, the magnetic shielding layer 5 can be formed readily even if it has a complicated configuration.

Figure 9A:
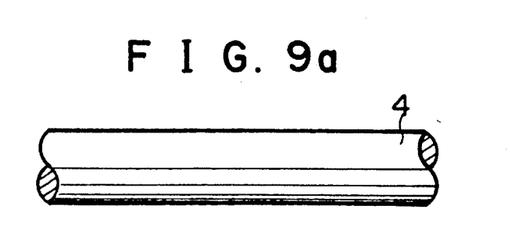
FIGS. 9a to 9d illustrate different steps of a still further process of producing a strain detector to which the present invention is applied.
Figure 9B:
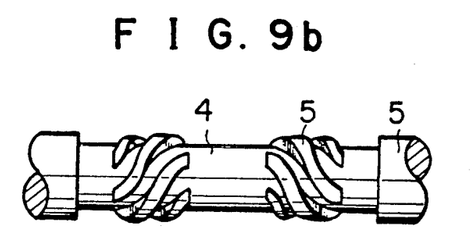
Figure 9C:
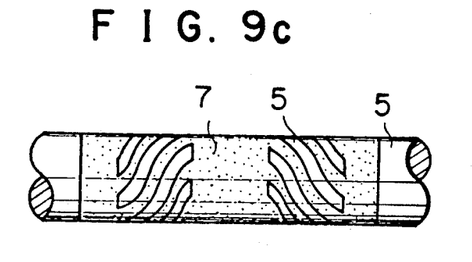
Figure 9D:
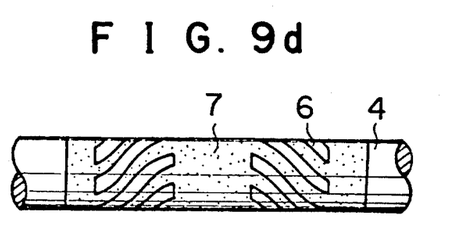
Figure 10A:
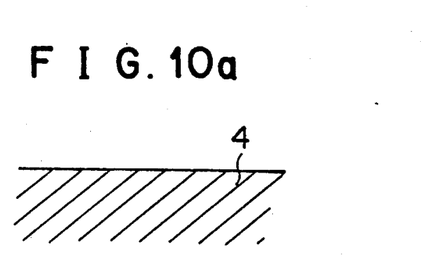
FIGS. 10a to 10d are enlarged sectional views corresponding to FIGS. 9a to 9d, respectively.
Figure 10B:
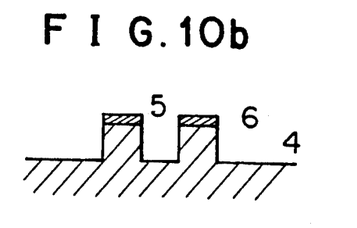
Figure 10C:
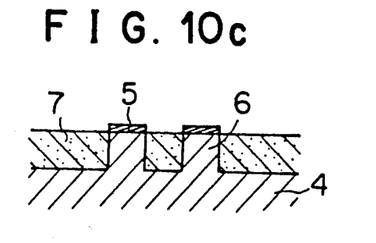
Figure 10D:
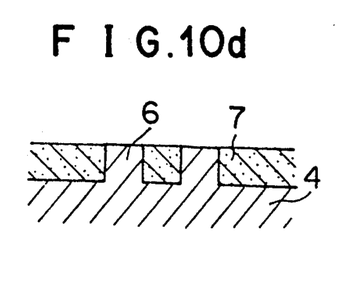

Referring now to FIGS. 9a to 9d and 10a to 10d, there is shown a yet further process of producing a strain detector to which the present invention is applied. A driven member 4 in the form of a shaft is formed as shown in FIGS. 9a and 10a from a soft magnetic material having a high permeability such as permalloy. Subsequently, etching resist 5 is selectively printed on a surface of the driven member 4 by screen printing, and then, chemical etching is performed using etching liquid such as solution of cupric chloride to selectively remove any portion of the surface of the driven member 4 other than those portions which are covered with the etching resist 5 thereby to leave a pair of magnetic layers 6 each composed of a plurality of magnetic layer stripes which are inclined by ±45 degrees with respect to a center axis of the driven member 4 as shown in FIGS. 9b and 10b. The magnetic layers 6 thus produced project from the other surface as seen in FIGS. 9b and 10b. Then, using the etching resist 5 as plating resist, a magnetic shielding layer 7 of a non-magnetic or diamagnetic metal having a high electric conductivity such as, for example, copper is formed by high speed plating on any portion of the driven member 4 from which material of the driven member 4 has been removed. In this instance, the plating conditions may be similar to those described hereinabove with reference to FIGS. 2a to 2c. Subsequently, the etching resist 5 as plating resist is removed to expose the magnetic layers 6 as shown in FIGS. 9d and 10d. Finally, a pair of detecting coils not shown are assembled in a similar manner as described hereinabove.

In the strain detector produced in this manner, since the magnetic layers 6 project like islands from the driven member 4 and the magnetic shielding layer 7 is provided around the magnetic layers 6, the magnetic shielding effect of the magnetic shielding layer 7 is promoted, and the magnetic layers 6 make magnetically different regions from the driven member 4. Consequently, the variation in permeability by a strain is increased and the sensitivity is improved. Besides, since the magnetic shield layer 7 is formed by high speed plating, it can be produced rapidly. Further, film thickness control can be conducted readily and the magnetic shielding layer 5 is high in adhering strength to the driven member 4. In addition, the magnetic shield can be produced with a high degree of accuracy and reliability.

Referring now to FIGS. 11a to 11d and 12a to 12d, there is shown a yet further process of producing a strain detector to which the present invention is applied.

Figure 11A:
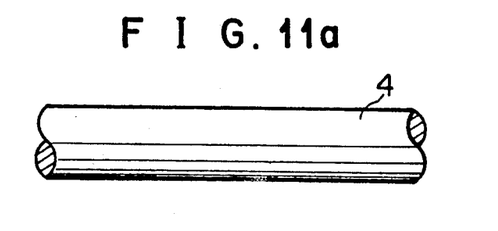
FIGS. 11a to 11e illustrate different steps of a yet further process of producing a strain detector to which the present invention is applied.
Figure 11B:
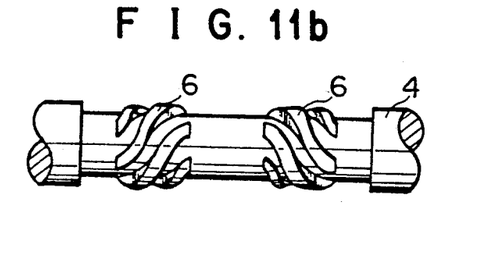
Figure 11C:
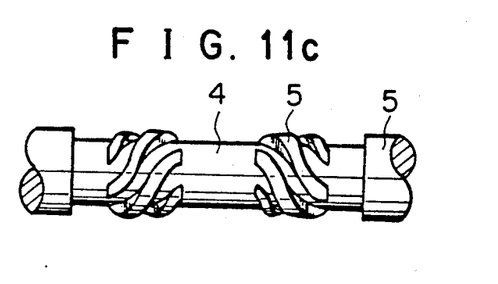
Figure 11D:
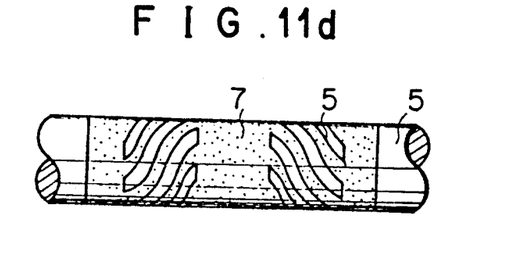
Figure 11E:
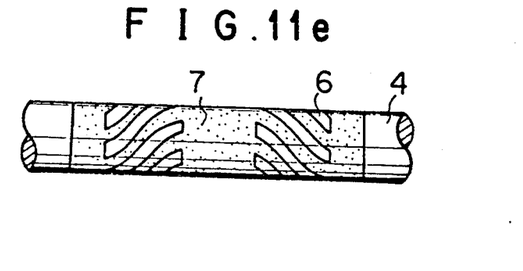
Figure 12A:
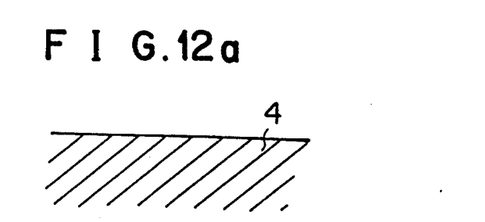
FIGS. 12a to 12e are enlarged sectional views corresponding to FIGS. 11a to 11e, respectively.
Figure 12B:
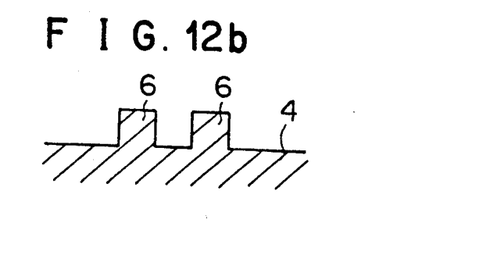
Figure 12C:
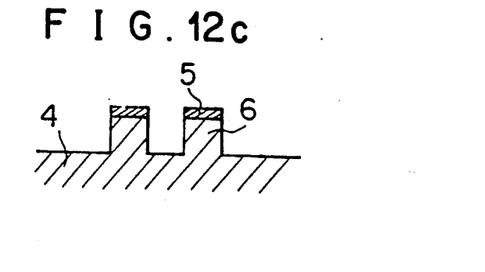
Figure 12D:
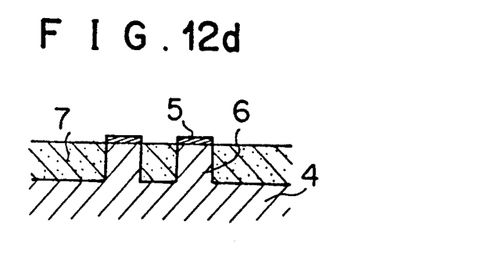
Figure 12E:
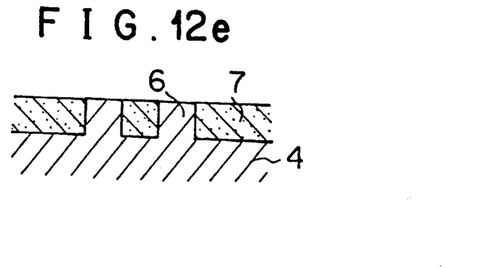

A driven member 4 is first formed as shown in FIGS. 11a and 12a from a soft magnetic material having a high permeability, and then a surface of the driven member 4 is selectively removed by mechanical machining to form a pair of magnetic layers 6 each composed of a plurality of magnetic layer stripes which are inclined by ±45 degrees with respect to a center axis of the driven member 4 as shown in FIGS. 11b and 12b. The magnetic layers 6 formed in this manner project from the other surface of the driven member 4. Then, plating resist 5 is formed by printing at top portions of the magnetic layers 6 as shown in FIGS. 11c and 12c, and after then, a magnetic shielding layer 7 is formed by high speed plating of copper on any portion of the driven member 4 other than those portions which are covered with the plating resist 5 as shown in FIGS. 11d and 12d. Subsequently, the plating resist 5 is removed to expose the magnetic layers 6 as seen in FIGS. 11e and 12e. The strain detector produced in this manner also operate in a similar manner and has similar effects to those of the strain detector produced by the process described hereinabove with reference to FIGS. 9a to 9d and 10a to 10d. It is to be noted that, while selective removal of the surface of the driven member is conducted by mechanical machining, it may otherwise be conducted using an energy beam such as a laser beam or an electron beam.

Having now fully described the invention, it will be apparent to one of ordinary skill in the art that many changes and modifications can be made thereto without departing from the spirit and scope of the invention as set forth herein.

What is claimed is:

1. A strain detector, comprising:
   a driven member, made of a soft magnetic material having a high permeability, for receiving an external force;
   a magnetic shielding layer made of a non-magnetic or diamagnetic material having a high electric conductivity and selectively formed on a surface of said driven member;
   a magnetic layer formed on a portion of the surface of said driven member at which said magnetic shielding layer is not formed;
   a protecting layer formed on surfaces of said magnetic layer and said magnetic shielding layer; and
   a detecting coil provided corresponding to said magnetic layer for detecting a variation in permeability of said magnetic layer corresponding to a strain of said magnetic layer by an external force applied to said driven member.

2. A strain detector as claimed in claim 1, wherein said magnetic layer includes portions between gaps in said magnetic shielding layers, such that an outer surface of said magnetic layer is even with an outer surface of said magnetic shielding layer.

3. A strain detector as claimed in claim 1, wherein said magnetic layer is formed integrally with said driven member, said magnetic shielding layer and said magnetic layer forming an even surface upon which said protective layer is formed.

4. A strain detector as claimed in claim 1, wherein said magnetic layer and magnetic shielding layer form an even surface upon which said protective layer is formed.

5. A strain detector, comprising:

a driven member, made of a soft magnetic material having a high permeability, for receiving an external force;

a magnetic layer formed in said driven member in such a manner as to project from said driven member by selectively removing a surface of said driven member;

a magnetic shielding layer made of a non-magnetic or diamagnetic material having a high electric conductivity and filled in the portion of said driven member from which said driven member is removed; and a detecting coil provided corresponding to said magnetic layer for detecting a variation in permeability of said magnetic layer corresponding to a strain of said magnetic layer by an external force applied to said driven member.

6. A strain detector as claimed in claim 5, further comprising a protecting layer formed on surfaces of said magnetic layer and said magnetic shielding layer.

7. A strain detector as claimed in claim 5, wherein said magnetic layer and magnetic shielding layer form an even surface.

* * * * *